United States Patent
Yan et al.

(10) Patent No.: US 10,742,376 B2
(45) Date of Patent: Aug. 11, 2020

(54) APERIODIC SRS TRANSMISSION METHOD AND APPARATUS

(71) Applicant: Huawei Technologies Co., Ltd., Shenzhen, Guangdong, P.R. (CN)

(72) Inventors: Zhiyu Yan, Shenzhen (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 16/188,140

(22) Filed: Nov. 12, 2018

(65) Prior Publication Data

US 2019/0081756 A1 Mar. 14, 2019

Related U.S. Application Data

(63) Continuation of application No. PCT/CN2016/082129, filed on May 13, 2016.

(51) Int. Cl.
- *H04L 5/00* (2006.01)
- *H04L 1/00* (2006.01)
- *H04L 27/00* (2006.01)
- *H04W 72/04* (2009.01)

(52) U.S. Cl.
CPC .............. *H04L 5/0048* (2013.01); *H04L 1/00* (2013.01); *H04L 5/0051* (2013.01);
(Continued)

(58) Field of Classification Search
CPC ... H04L 5/0048; H04L 5/0051; H04L 5/0053; H04L 27/0006; H04L 1/00; H04W 72/0446; H04W 72/042
See application file for complete search history.

(56) References Cited

U.S. PATENT DOCUMENTS

| | | | |
|---|---|---|---|
| 2012/0243505 A1 | 9/2012 | Lin | |
| 2013/0182618 A1* | 7/2013 | Chen | H04L 5/1469 370/280 |
| 2013/0242911 A1 | 9/2013 | Heo et al. | |
| 2014/0010182 A1 | 1/2014 | Chunli et al. | |

FOREIGN PATENT DOCUMENTS

| | | |
|---|---|---|
| CN | 102098086 A | 6/2011 |
| CN | 102404074 A | 4/2012 |
| CN | 105577339 A | 5/2016 |
| EP | 3399687 A1 | 11/2018 |

OTHER PUBLICATIONS

Ericsson, "On Aperiodic SRS Transmission without PUSCH for Enhanced LAA," R1-163143, 3GPP TSG RAN WG1 #84bis, Busan, Korea, Apr. 11-15, 2016, 3 pages.

(Continued)

*Primary Examiner* — Hashim S Bhatti
(74) *Attorney, Agent, or Firm* — Fish & Richardson P.C.

(57) ABSTRACT

Embodiments of the present disclosure provide an aperiodic SRS transmission method and an apparatus, and relate to the communications field, so as to resolve a problem that an existing terminal device cannot send an aperiodic SRS on a carrier of an unlicensed spectrum. The transmission method includes: obtaining, by a terminal device, first indication information, where the first indication information is used to instruct the terminal device to send an aperiodic sounding reference signal SRS on a first symbol in a first subframe; and sending, by the terminal device, the aperiodic SRS on the first symbol based on the first indication information.

17 Claims, 6 Drawing Sheets

(52) U.S. Cl.
CPC ........ *H04L 5/0053* (2013.01); *H04L 27/0006* (2013.01); *H04W 72/042* (2013.01); *H04W 72/0446* (2013.01)

(56) References Cited

OTHER PUBLICATIONS

MediaTek Inc., "Considerations on SRS for LAA", 3GPP TSG RAN WG1 Meeting #84bits, Busan, Korea Apr. 11-15, 2016, 3 pages, R1-162938.

ZTE Microelectronics Technology, Nubia Technology , "Discussion on SRS design for eLAA UL", 3GPP TSG RAN WG1 Meeting #84bis, Busan, Korea Apr. 11-15, 2016, 4 pages, R1-162324.

LG Electronics, "SRS transmission in LAA", 3GPP TSG RAN WG1 Meeting #84bis, Busan, Korea, Apr. 11-15, 2016, 4 pages, R1-162467.

Nokia, Alcatel-Lucent Shanghai Bell, "On LAA SRS Design",3GPP TSG-RAN WG1 Meeting #84bis, Busan, South Korea, Apr. 11-15, 2016, 5 pages, R1-162918.

ITL, "SRS design in Rel-14 eLAA", 3GPP TSG RAN WG1 meeting #84bis, Busan, Korea Apr. 11-15, 2016, 5 pages, R1-163304.

3GPP TS 36.213 V12.9.0 (Mar. 2016), 3rd Generation Partnership Project, Technical Specification Group Radio Access Network, Evolved Universal Terrestrial Radio Access (E-UTRA), Physical layer procedures(Release 12), 241 pages.

Office Action issued in Chinese Application No. 201680085390.4 dated Nov. 29, 2019, 24 pages (With English Translation).

\* cited by examiner

```
Access
network device                                          Terminal device
     |                                                         |
     |     S200. Send first indication information             |
     |------(instructing a terminal device to send an aperiodic----->|
     |      SRS on a first symbol in a first subframe)         |
     |                                                         |
     |                                         S201. Receive the first
     |                                         indication information
     |                                                         |
     |       S202. Send the aperiodic SRS on the               |
     |<------first symbol in the first subframe----------------|
     |                                                         |
```

APERIODIC SRS TRANSMISSION METHOD AND APPARATUS

CROSS-REFERENCE TO RELATED APPLICATIONS

This application is a continuation of International Application No. PCT/CN2016/082129 filed on May 13, 2016, the disclosure of which is hereby incorporated by reference in its entirety.

TECHNICAL FIELD

Embodiments of the present application relate to the communications field, and in particular, to an aperiodic SRS transmission method and an apparatus.

BACKGROUND

In an existing LTE (Long Term Evolution) system, an eNB (evolved NodeB) may estimate channel quality of an uplink channel based on an SRS (sounding reference symbol), to perform uplink scheduling based on the channel quality estimated by the eNB, or may obtain channel quality of a downlink channel based on the SRS by using channel reciprocity, to implement downlink scheduling and transmission. A current standard has two different types of SRSs: a periodic SRS and an aperiodic SRS.

With rapid development of a mobile service, supporting an LTE system in accessing an unlicensed spectrum is an effective manner to improve service quality of the mobile service. In addition, an LAA (licensed-assisted access, or unlicensed spectrum) system is introduced into the 3GPP (3rd Generation Partnership Project). The LAA system accesses the unlicensed spectrum by using a CA (carrier aggregation) technology and a licensed-assisted access using LTE system.

In the prior art, when sending an aperiodic SRS, a terminal device can send aperiodic SRSs on only some fixed symbols in a subframe. If the fixed symbols in a subframe are used to send downlink data or send other uplink data, the existing terminal device cannot send the aperiodic SRS. In the LAA system, a problem that the existing terminal device cannot send the aperiodic SRS is particularly serious.

SUMMARY

Embodiments of the present disclosure provide an aperiodic SRS transmission method and an apparatus, to resolve a problem that an existing terminal device cannot send an aperiodic SRS on a carrier of an unlicensed spectrum.

To achieve the foregoing objective, the embodiments of the present disclosure use the following technical solutions:

According to a first aspect, an embodiment of the present disclosure provides an aperiodic SRS transmission method. After obtaining first indication information used to instruct a terminal device to send an aperiodic SRS on a first symbol in a first subframe, the terminal device sends the aperiodic SRS on the first symbol in the first subframe based on the first indication information.

In this embodiment of the present disclosure, the terminal device can obtain the first indication information used to instruct the terminal device to send the aperiodic SRS in the first subframe. Therefore, the terminal device can send the aperiodic SRS on the first symbol in the first subframe based on the first indication information, to be specific, a symbol used when the terminal device sends the aperiodic SRS is no longer fixed, so as to effectively resolve the problem that an existing terminal device cannot send an aperiodic SRS on a carrier of an unlicensed spectrum.

According to a second aspect, an embodiment of the present disclosure provides an aperiodic SRS transmission method. An access network device sends first indication information to a terminal device. The first indication information is used to instruct the terminal device to send an aperiodic sounding reference signal SRS on a first symbol in a first subframe. The access network device receives, on the first symbol in the first subframe, the aperiodic SRS sent by the terminal device.

In this embodiment of the present disclosure, a symbol used when the terminal device sends the aperiodic SRS is configured by the access network device. Therefore, the symbol used when the terminal device sends the aperiodic SRS is no longer fixed, so as to effectively resolve the problem that an existing terminal device cannot send an aperiodic SRS on a carrier of an unlicensed spectrum.

According to a third aspect, an embodiment of the present disclosure provides a terminal device, and the terminal device includes an obtaining unit and a sending unit.

Specifically, a function implemented by each unit module provided in this embodiment of the present disclosure is as follows:

The obtaining unit is configured to obtain first indication information, where the first indication information is used to instruct the terminal device to send an aperiodic sounding reference signal SRS on a first symbol in a first subframe.

The sending unit is configured to send the aperiodic SRS on the first symbol based on the first indication information obtained by the obtaining unit.

In this embodiment of the present disclosure, the terminal device can obtain the first indication information used to instruct the terminal device to send the aperiodic SRS in the first subframe. Therefore, the terminal device can send the aperiodic SRS on the first symbol in the first subframe based on the first indication information, to be specific, a symbol used when the terminal device sends the aperiodic SRS is no longer fixed, so as to effectively resolve the problem that an existing terminal device cannot send an aperiodic SRS on a carrier of an unlicensed spectrum.

According to a fourth aspect, an embodiment of the present disclosure provides an access network device, and the access network device includes a sending unit and a receiving unit.

Specifically, a function implemented by each unit module provided in this embodiment of the present disclosure is as follows:

The sending unit is configured to send first indication information to a terminal device, where the first indication information is used to instruct the terminal device to send an aperiodic sounding reference signal SRS on a first symbol in a first subframe.

The receiving unit is configured to receive, on the first symbol in the first subframe, the aperiodic SRS sent by the terminal device.

In this embodiment of the present disclosure, a symbol used when the terminal device sends the aperiodic SRS is configured by the access network device. Therefore, the symbol used when the terminal device sends the aperiodic SRS is no longer fixed, so as to effectively resolve the problem that an existing terminal device cannot send an aperiodic SRS on a carrier of an unlicensed spectrum.

According to a fifth aspect, an embodiment of the present disclosure provides a terminal device, and the terminal device includes a memory, a processor, a communications interface, and a system bus. The memory, the processor, and the communications interface are connected by using the system bus, the memory is configured to store a computer instruction, and the processor is configured to execute the computer instruction stored in the memory, so that the terminal device performs the aperiodic SRS transmission method according to the foregoing aspect.

For a technical effect of the terminal device provided in this embodiment of the present disclosure, refer to the technical effect of the terminal device described in the aperiodic SRS transmission method performed by the terminal device in the foregoing embodiment. Details are not described herein again.

According to a sixth aspect, an embodiment of the present disclosure provides an access network device, and the access network device includes a memory, a processor, a communications interface, and a system bus. The memory, the processor, and the communications interface are connected by using the system bus, the memory is configured to store a computer instruction, and the processor is configured to execute the computer instruction stored in the memory, so that the access network device performs the aperiodic SRS transmission method according to the foregoing aspect.

For a technical effect of the access network device provided in this embodiment of the present disclosure, refer to the technical effect of the access network device described in the aperiodic SRS transmission method performed by the access network device in the foregoing embodiment. Details are not described herein again.

Optionally, in the foregoing aspects and optional implementations of the foregoing aspects, the first symbol belongs to a first symbol set, the first symbol set includes at least one symbol, any one of the at least one symbol is a symbol that is in the first subframe and that is used to send an aperiodic SRS, and if the first symbol set includes at least two symbols, any two of the at least two symbols are discontinuous in terms of time.

When the first symbol set includes the at least two symbols, any two of the at least two symbols are discontinuous in terms of time, to help improve a success rate of preempting a communication channel in an unlicensed spectrum by different terminal devices in a network system, thereby ensuring that the different terminal devices can effectively send aperiodic SRSs.

Optionally, the first subframe is a last subframe in a downlink burst, and a quantity of symbols in the first subframe that are used to send downlink data is less than a quantity of symbols included in the first subframe.

In an LAA system, the terminal device can send data only when determining that a communication channel is in an idle state, and a maximum channel occupancy time exists when the terminal device occupies the communication channel. To ensure spectrum efficiency, in the maximum channel occupancy time during which the terminal device occupies the communication channel, some symbols in a last subframe sent by the access network device are used to send downlink data. The downlink burst is at least one downlink subframe continuously occupied in terms of time. Therefore, the first subframe may be the last subframe in the downlink burst, and the quantity of symbols in the first subframe that are used to send the downlink data is less than the quantity of symbols included in the first subframe.

Optionally, the first symbol set is a symbol set corresponding to a first value in a preset correspondence, the preset correspondence includes a correspondence between the first value and the first symbol set, the first value is used to indicate a quantity of symbols in the first subframe that are included in a second symbol set, and the second symbol set includes a symbol that is in the first subframe and that is used to send downlink data.

The preset correspondence in this embodiment of the present disclosure is used to indicate a correspondence between a quantity of symbols in a subframe that are used to send downlink data and information about a symbol that is in the subframe and that is used to send an aperiodic SRS. Because a process of sending the aperiodic SRS actually belongs to a process of sending uplink data, the subframe is a subframe in which some symbols are used to send the downlink data, some symbols are used to send uplink data, and some of the symbols used to send the uplink data are used to send aperiodic SRSs.

The first subframe in this embodiment of the present disclosure may be a subframe that includes the first symbol set and the second symbol set. The first symbol set is a set that includes a symbol that is in the first subframe and that is used to send an aperiodic SRS, and the second symbol set is a set that includes a symbol that is in the first subframe and that is used to send downlink data. In this way, the preset correspondence may include the correspondence between the first value and the first symbol set. The first value indicates the quantity of symbols in the first subframe that are used to send the downlink data.

Optionally, the first symbol set is a symbol set indicated by second indication information, and the second indication information is information in higher layer signaling or physical layer signaling sent by the access network device.

When the access network device sends downlink data to the terminal device, the access network device can learn which symbols in the first subframe are occupied by the access network device to send the downlink data, so that the access network device can learn of a first value. In this way, the access network device can learn of information about the first symbol set based on the first value and the preset correspondence described above. The access network device can send, to the terminal device by using the higher layer signaling or the physical layer signaling, the second indication information indicating the first symbol set.

It is easily understood that the terminal device may obtain the first symbol set in a plurality of manners. For example, the terminal device obtains the first symbol set from the preset correspondence based on the first value, or the terminal device receives the higher layer signaling or the physical layer signaling that carries the second indication information and that is sent by the access network device, and obtains the first symbol set based on the second indication information. Regardless of which manner in which the terminal device obtains the first symbol set, the terminal device may obtain the first symbol from the first symbol set.

The terminal device obtains the first symbol set, to help reduce a quantity of bits in the first indication information that are used to indicate the first symbol.

Optionally, the first indication information is information in a control message sent by the access network device, the first indication information is one of M pieces of specific indication information included in the control message, a $J^{th}$ piece of specific indication information in the M pieces of specific indication information is used to instruct a $J^{th}$ terminal device not to send an aperiodic SRS or instruct the $J^{th}$ terminal device to send the aperiodic SRS on a $P^{th}$ symbol in a second subframe, and the second subframe is a subframe on a carrier of an unlicensed spectrum, where $M \geq 2$, $J \leq M$, and $P \geq 1$.

The control message sent by the access network device may be received by a plurality of terminal devices. To improve resource utilization, the control message sent by the access network device may include the M pieces of specific indication information. In this way, a maximum of M terminal devices may send aperiodic SRSs based on specific indication information corresponding to each of the M terminal devices.

It is easily understood that the second subframe is any subframe on the carrier of the unlicensed spectrum. The first indication information is one of the M pieces of specific indication information. If the $J^{th}$ piece of specific indication information is the first indication information, the second subframe and the first subframe in this embodiment of the present disclosure are a same subframe. If the $J^{th}$ piece of specific indication information is not the first indication information, the second subframe and the first subframe in this embodiment of the present disclosure are different subframes.

Optionally, the control message further includes N pieces of common reference indication information, a $K^{th}$ piece of common reference indication information in the N pieces of common reference indication information is corresponding to a $K^{th}$ terminal device group, each terminal device in the $K^{th}$ terminal device group sends an aperiodic SRS by referring to the $K^{th}$ piece of common reference indication information, and each terminal device in the $K^{th}$ terminal device group sends the aperiodic SRS within a same time period, where $N \geq 1$ and $K \leq N$.

Optionally, the $K^{th}$ piece of common reference indication information includes at least one of reference information of performing clear channel assessment by the terminal device in the $K^{th}$ terminal device group and time information of sending the aperiodic SRS by the terminal device in the $K^{th}$ terminal device group, and the time information of sending the aperiodic SRS by the terminal device in the $K^{th}$ terminal device group includes information about a subframe in which the terminal device in the $K^{th}$ terminal device group sends the aperiodic SRS.

In the LAA system, before sending the aperiodic SRS, the terminal device assesses a communication channel through clear channel assessment, to determine whether the communication channel is in an idle state. Different terminal devices that send aperiodic SRSs within a same time period assess the communication channel with reference to same reference information. In this embodiment of the present disclosure, only one piece of common reference indication information in the control message is used to represent the information referenced by the terminal devices, to effectively reduce resource usage of the control message.

Optionally, the control message further includes terminal device set identification information, the terminal device set identification information is used to identify a terminal device set, and each terminal device in the terminal device set sends an aperiodic SRS based on the control message.

The control message includes the terminal device set identification information, to help the terminal device in the LAA system determine whether the terminal device needs to receive the control message, and then send the aperiodic SRS based on the control message.

The control message in this embodiment of the present disclosure may be applied to an application scenario in which the terminal device communicates with the access network device on a carrier of an unlicensed spectrum, or may be applied to an application scenario in which the terminal device communicates with the access network device on a carrier of a licensed spectrum. In other words, the control message that includes the N pieces of common reference indication information and/or the terminal device set identification information is applicable to the application scenario of the carrier of the licensed spectrum or the application scenario of the carrier of the unlicensed spectrum.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure.

DETAILED DESCRIPTION

Figures 1, 2:
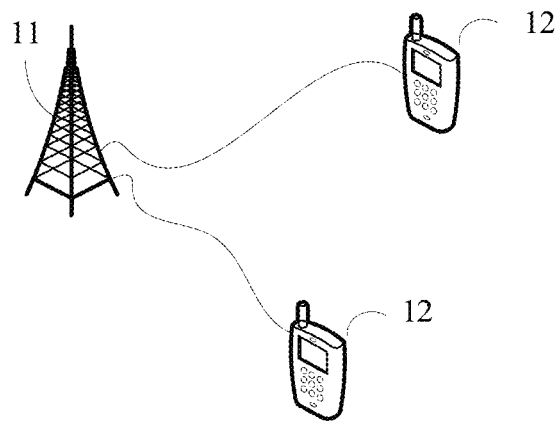
FIG. 1 is a schematic structural diagram of a network system according to an embodiment of the present disclosure.
FIG. 2 is a schematic flowchart of an aperiodic SRS transmission method according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure.

In the following description, specific details such as a particular system structure, an interface, and a technology are set forth in an illustrative but not a restrictive sense to make a thorough understanding of the present disclosure. However, a person skilled in the art should know that the present disclosure may be practiced in other embodiments without these specific details. In other cases, detailed descriptions of well-known apparatuses, circuits, and methods are omitted, so that the present disclosure is described without being obscured by unnecessary details.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that ordinal numbers such as "first" and "second" mentioned in the embodiments of the present disclosure are only used for differentiation, unless the ordinal numbers definitely represent a sequence based on the context.

An LAA system accesses an unlicensed spectrum by using a CA technology and a licensed-assisted access using LTE system.

To implement harmonious coexistence of the LAA system and an inter-system such as Wi-Fi (Wireless Fidelity) system on the unlicensed spectrum, the LAA system assesses a communication channel in the unlicensed spectrum through CCA (clear channel assessment) by using an LBT (listen before talk) channel access mechanism. A terminal device can send data by using the communication channel in the unlicensed spectrum only when an assessment result indicates that the channel is idle.

Specifically, the terminal device may complete a CCA process in any one of the following manners:

1. The terminal device performs single timeslot-based CCA listening, and a timeslot length is a preset time length, for example, 25 microseconds or 34 microseconds. The terminal device compares an energy detection threshold with a power received by the terminal device on the communication channel in the unlicensed spectrum in the CCA timeslot. If the power received by the terminal device on the communication channel in the unlicensed spectrum is higher than the energy detection threshold, the terminal device determines that the communication channel in the unlicensed spectrum is in a busy state, and the terminal device cannot occupy the communication channel in the unlicensed spectrum. If the power received by the terminal device on the communication channel in the unlicensed spectrum is lower than the energy detection threshold, the terminal device determines that the communication channel in the unlicensed spectrum is in an idle state, and the terminal device can occupy the communication channel in the unlicensed spectrum to send data.

Further, if the terminal device determines that the communication channel in the unlicensed spectrum is in a busy state, the terminal device may immediately enter a next CCA timeslot until the terminal device determines that the communication channel in the unlicensed spectrum is in an idle state or the terminal device gives up sending data.

2. The terminal device first randomly generates a backoff count value j between 0 and q, and sets a value of a counter in the terminal device to the backoff count value j, where q is a contention window length, for example, the contention window length is [3, 7] or [15, 63], and then the terminal device continuously performs listening at a granularity of 9 µs. If the terminal device performs listening in a CCA timeslot and determines that the communication channel in the unlicensed spectrum is in an idle state, the terminal device decreases the value of the counter in the terminal device by 1. If the terminal device performs listening in a CCA timeslot and determines that the communication channel in the unlicensed spectrum is in a busy state, the terminal device suspends the counter in the terminal device, and does not decrease the value of the counter until next time the terminal device determines that the communication channel in the unlicensed spectrum is in an idle state. When the value of the counter in the terminal device is decreased to 0, the terminal device determines that the communication channel in the unlicensed spectrum is in an idle state, and the terminal device can occupy the communication channel in the unlicensed spectrum to send data.

In a normal case, a time length in which the terminal device occupies the communication channel in the unlicensed spectrum is limited. A maximum time length in which the terminal device is allowed to occupy the communication channel in the unlicensed spectrum to send data is an MCOT (maximum channel occupancy time).

The MCOT may be related to a regional regulation constraint. For example, in Japan, the MCOT is four milliseconds; and in Europe, the MCOT is eight milliseconds, 10 milliseconds, or 13 milliseconds. The MCOT may also be related to a contention mechanism used by a terminal device that performs CCA. A shorter listening time usually indicates a shorter MCOT. A length of the MCOT may also be related to a service class of data transmission. In an example of an Internet telephone service, if a priority of the service is relatively high, the MCOT may be two milliseconds. Therefore, after the terminal device performs CCA and determines that the communication channel in the unlicensed spectrum is allowed to be occupied, the terminal device can continuously occupy the communication channel in the unlicensed spectrum two milliseconds to send data. In an example of a data transmission service, if a priority of the service is relatively low, the MCOT may be eight milliseconds or 10 milliseconds.

In the LAA system, to ensure spectrum efficiency, when an access network device occupies the communication channel in the unlicensed spectrum to send downlink data, the access network device may occupy only some symbols in a last subframe in a downlink burst.

The downlink burst (DL Burst) is at least one downlink subframe continuously occupied in terms of time. After determining that the communication channel in the unlicensed spectrum is in an idle state, the access network device occupies the communication channel in the unlicensed spectrum to send the downlink data. When currently sending the downlink data, the access network device does not need to perform the CCA process again. A time length of the downlink burst is not greater than the MCOT.

For example, the access network device is a base station, the last subframe in the downlink burst includes 14 symbols, and the base station occupies the first K symbols in the last subframe to send the downlink data, where K is one of 3, 6, 9, 10, 11, 12, and 14.

When sending an aperiodic SRS, an existing terminal device can send aperiodic SRSs on only some fixed symbols in a subframe. If the fixed symbols in the subframe are used to send downlink data or send other uplink data, the existing terminal device cannot send the aperiodic SRS. For this problem, an embodiment of the present disclosure provides an aperiodic SRS transmission method and an apparatus. An access network device sends, to a terminal device, first indication information used to instruct the terminal device to send an aperiodic SRS on a first symbol in a first subframe, so that the terminal device can send the aperiodic SRS on the first symbol in the first subframe based on the first indication information. This can effectively resolve the problem that the existing terminal device cannot send the aperiodic SRS.

The aperiodic SRS transmission method provided in this embodiment of the present disclosure is applied to a network system. As shown in FIG. 1, the network system includes an access network device 11 and at least one terminal device 12, and each terminal device 12 is connected to the access network device 11 by using a network.

The access network device 11 may be a base station, an access point, or a device that is in an access network and that communicates with a wireless terminal over an air interface by using one or more sectors. The base station may be configured to mutually convert a received over-the-air frame and an IP (Internet Protocol) packet, and the base station may serve as a router between the wireless terminal and a remaining part of the access network. The remaining part of the access network may include an IP network. The base station may further coordinate attribute management of the air interface. For example, the base station may be a BTS (base transceiver station) in a GSM (Global System for Mobile Communications) or a CDMA (Code Division Multiple Access) system, or may be a NodeB in a WCDMA (Wideband Code Division Multiple Access) system, or may be an eNB in LTE. This is not limited in this embodiment of the present disclosure.

The access network device 11 sends a control message that includes M pieces of specific indication information, so that each terminal device 12 sends an aperiodic SRS based on specific indication information corresponding to the terminal device 12.

The terminal device 12 is a wireless terminal. The wireless terminal may be a device that provides voice and/or data connectivity for a user, a handheld device with a wireless connection function, or another processing device connected to a wireless modem. The wireless terminal may communicate with one or more core networks by using a radio access network (for example, radio access network (RAN)). The wireless terminal may be a mobile terminal, such as a mobile phone (or referred to as a "cellular" phone) or a computer with a mobile terminal, or may be a portable, pocket-sized, handheld, computer built-in, or in-vehicle mobile apparatus, and exchanges voice and/or data with the radio access network. For example, the wireless terminal may be a device such as a PCS (personal communications service) phone, a cordless phone, a Session Initiation Protocol (SIP) phone, a WLL (wireless local loop) station, or a PDA (personal digital assistant). The wireless terminal may also be referred to as a user agent, a user device, or user equipment.

The terminal device 12 can receive the control message that includes the M pieces of specific indication information and that is sent by the access network device 11, and send an aperiodic SRS based on specific indication information corresponding to the terminal device 12.

Preferably, the aperiodic SRS transmission method provided in this embodiment of the present disclosure is applicable to an LAA system.

FIG. 2 is a schematic flowchart of an aperiodic SRS transmission method according to an embodiment of the present disclosure. The transmission method may be applied to the network system described in FIG. 1.

Referring to FIG. 2, the transmission method includes the following steps.

S200. An access network device sends first indication information to a terminal device.

The first indication information is used to instruct the terminal device to send an aperiodic SRS on a first symbol in a first subframe.

S201. The terminal device receives the first indication information.

S202. The terminal device sends an aperiodic SRS to the access network device on a first symbol in a first subframe based on the first indication information received by the terminal device.

One subframe usually includes a plurality of symbols. In this embodiment of the present disclosure, the first symbol belongs to a first symbol set, the first symbol set includes at least one symbol, and any one of the at least one symbol is a symbol that is in the first subframe and that is used to send an aperiodic SRS.

After receiving the first indication information, the terminal device sends the aperiodic SRS to the access network device on the first symbol in the first subframe based on an instruction of the first indication information.

The first indication information may be indication information sent by the access network device by using physical layer signaling, and the indication information includes one of the following pieces of information:

(1) A status indicating whether the terminal device needs to send the aperiodic SRS in the first subframe.

If the status indicates that the terminal device needs to send the aperiodic SRS in the first subframe, the terminal device determines that the first indication information is used to instruct the terminal device to send the aperiodic SRS in the first subframe. If the status indicates that the terminal device does not need to send the aperiodic SRS in the first subframe, the terminal device does not send the aperiodic SRS in the first subframe.

The terminal device may determine the first symbol in the first subframe in either of the following two manners:

In a first manner, the terminal device determines a location of the first symbol by using a location of a predefined symbol that is in the first subframe and that is used to send the aperiodic SRS.

In a second manner, the terminal device determines a location of the first symbol through an operation performed based on a terminal device identifier of the terminal device and a predefined rule.

For example, if a value of the terminal device identifier is UE_ID, the first symbol is a $P^{th}$ symbol in symbols in the first subframe that are used to send an aperiodic SRS, where P=(UE_ID mod L)+1, and L is a quantity of symbols in the first subframe that are used to send the aperiodic SRS.

The terminal device identifier may be any one of a C-RNTI (cell radio network temporary identifier), an IMEI (international mobile equipment identity), an IMSI (international mobile subscriber identity, international mobile subscriber identity), a GUTI (globally unique temporary identity), an IP address, and the like that are of the terminal device.

Optionally, the terminal device performs clear channel assessment before sending the aperiodic SRS on the first symbol in the first subframe.

If the terminal device determines that the terminal device is allowed to occupy the first symbol in the first subframe to send information, the terminal device sends the aperiodic SRS on the first symbol in the first subframe. If the terminal device determines that the terminal device is not allowed to occupy the first symbol in the first subframe to send information, the terminal device cannot send the aperiodic SRS in the first subframe.

If the status indicates that the terminal device does not need to send the aperiodic SRS in the first subframe, the terminal device does not send the aperiodic SRS in the first subframe.

(2) A status indicating that the terminal device does not send the aperiodic SRS in the first subframe, or indicating that the terminal device sends the aperiodic SRS on the first symbol in the first subframe and indicating a location of the first symbol in the first subframe.

If the first indication information is used to instruct the terminal device not to send the aperiodic SRS in the first subframe, the terminal device does not send the aperiodic SRS in the first subframe.

If the first indication information is used to instruct the terminal device to send the aperiodic SRS on the first symbol in the first subframe, the terminal device determines a location of the first symbol in the first subframe based on the first indication information, to be specific, information about the location of the first symbol in the first subframe is included in the first indication information.

For example, if the first subframe is a last subframe in a downlink burst, and a quantity of symbols in the first subframe that are used to send downlink data is less than a quantity of symbols included in the first subframe, the first indication information indicates a location of the first symbol in L-D symbols other than the symbols used to send the downlink data in the first subframe. L is the quantity of symbols included in the first subframe, and D is the quantity of symbols in the first subframe that are used to send the downlink data. After determining that the terminal device is instructed by the first indication information to send the aperiodic SRS on the first symbol in the first subframe, the terminal device sends the aperiodic SRS on the first symbol in the first subframe.

Optionally, the terminal device performs clear channel assessment before sending the aperiodic SRS on the first symbol in the first subframe.

If the terminal device determines that the terminal device is allowed to occupy the first symbol in the first subframe to send information, the terminal device sends the aperiodic SRS on the first symbol in the first subframe. If the terminal device determines that the terminal device is not allowed to occupy the first symbol in the first subframe to send information, the terminal device does not send the aperiodic SRS in the first subframe.

Specifically, if the first subframe is a last subframe in a downlink burst, a quantity of symbols in the first subframe that are included in a first symbol set is less than a quantity of symbols included in the first subframe.

By referring to the foregoing description, it is easily understood that if the first subframe is the last subframe in the downlink burst, some symbols in the first subframe are used to send downlink data. In this embodiment of the present disclosure, a symbol set including the symbols in the first subframe that are used to send the downlink data is named as a second symbol set. Optionally, the second symbol set includes at least three symbols, and each of the at least three symbols is used to send downlink data.

Further, if the first subframe is the last subframe in the downlink burst, in addition to the first symbol set and the second symbol set, the first subframe further includes at least one other symbol used to send uplink data.

Figure 3:
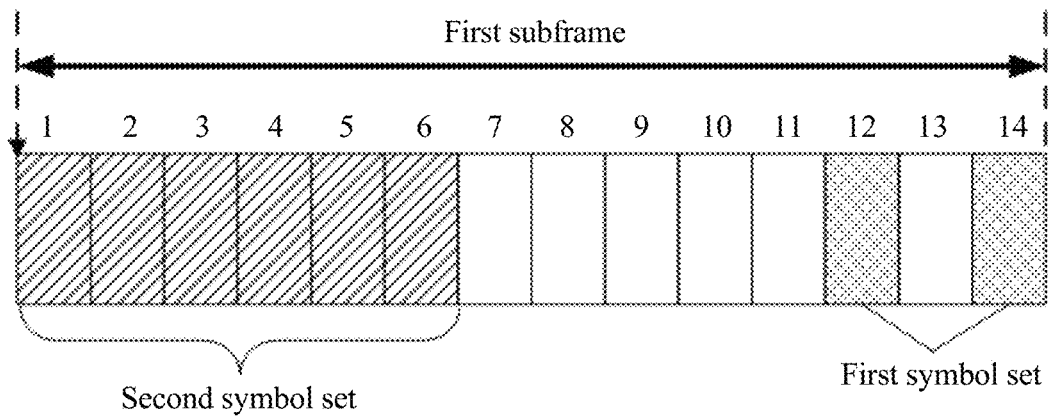
FIG. 3 is a first schematic structural diagram of a first subframe according to an embodiment of the present disclosure.

For example, as shown in FIG. 3, a first subframe is a last subframe in a downlink burst, and the first subframe includes 14 symbols. A width of a smallest box in FIG. 3 represents a time of one symbol. In the first subframe, the first six symbols are used to send downlink data, and a twelfth symbol and a fourteenth symbol are used to send aperiodic SRSs, to be specific, the twelfth symbol and the fourteenth symbol in FIG. 1 form a first symbol set in the first subframe, and the first six symbols form a second symbol set in the first subframe.

Optionally, if the first symbol set includes at least two symbols, any two of the at least two symbols are discontinuous in terms of time.

Quantities of symbols between any two adjacent symbols in the at least two symbols may be the same or different.

Preferably, any two adjacent symbols in the at least two symbols are separated by one symbol.

Figure 4:
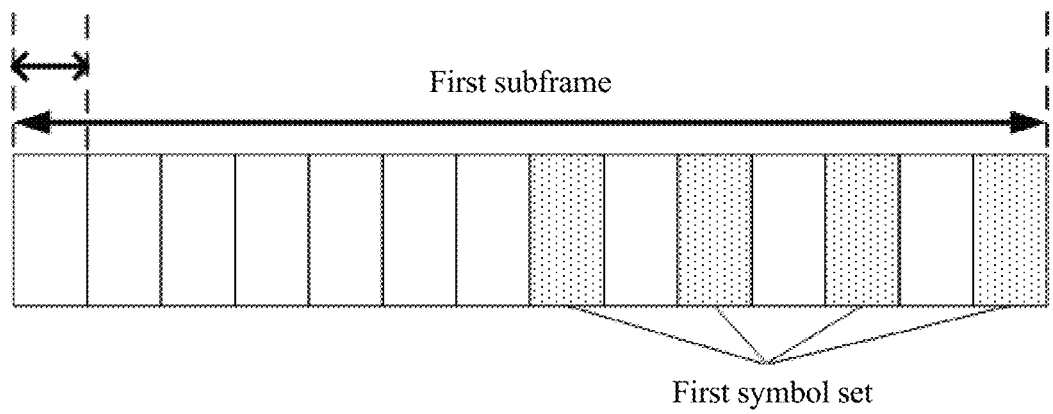
FIG. 4 is a second schematic structural diagram of a first subframe according to an embodiment of the present disclosure.

For example, as shown in FIG. 4, a first symbol set in a first subframe includes four symbols, and any two adjacent symbols in the four symbols are separated by one symbol.

Figure 5:
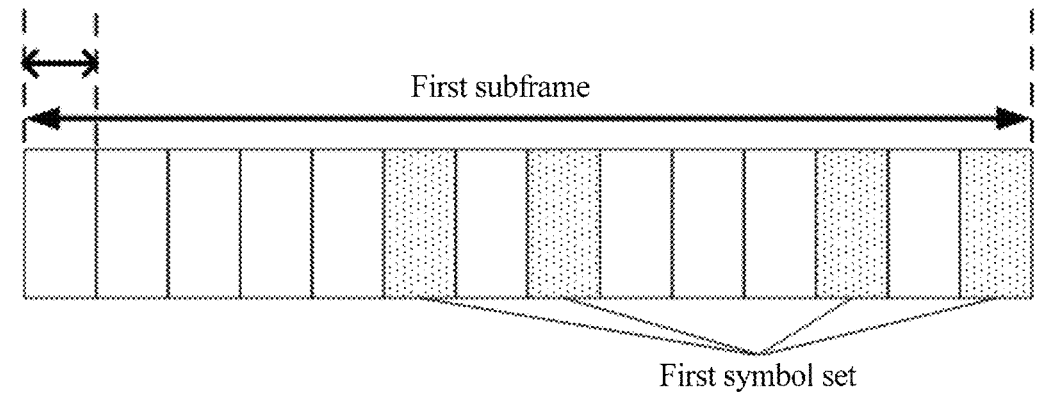
FIG. 5 is a third schematic structural diagram of a first subframe according to an embodiment of the present disclosure.

For example, as shown in FIG. 5, a first symbol set in a first subframe includes four symbols, and quantities of symbols between any two of the four symbols are different.

When the first symbol set includes at least two symbols, any two of the at least two symbols are discontinuous in terms of time. The terminal device listens to an idle state of a channel within a time interval between the at least two symbols, to help improve a success rate of preempting a communication channel in an unlicensed spectrum by different terminal devices in the network system, thereby ensuring that the different terminal devices can effectively send aperiodic SRSs.

The first symbol set in this embodiment of the present disclosure is a symbol set corresponding to a first value in a preset correspondence.

The preset correspondence includes a correspondence between the first value and the first symbol set, the first value is used to indicate a quantity of symbols in the first subframe that are included in the second symbol set, and the second symbol set is a set that includes a symbol that is in the first subframe and that is used to send downlink data.

The preset correspondence in this embodiment of the present disclosure is used to indicate a correspondence between a quantity of symbols in a subframe that are used to send downlink data and information about a symbol that is in the subframe and that is used to send an aperiodic SRS. Because a process of sending the aperiodic SRS belongs to a process of sending uplink information, the subframe is a subframe in which some symbols are used to send the downlink data, some symbols are used to send uplink information, and some of the symbols used to send the uplink information are used to send aperiodic SRSs. The uplink information herein is at least one of a PUSCH (physical uplink shared channel), a PUCCH (physical uplink control channel), a PRACH (physical random access channel), and an SRS.

Optionally, the preset correspondence in this embodiment of the present disclosure may be stored in the terminal device, or may be stored in the access network device. This is not specifically limited in this embodiment of the present disclosure.

Optionally, the preset correspondence in this embodiment of the present disclosure may be indicated by using a table, or may be indicated by using another graph that can be used to describe the correspondence. This is not specifically limited in this embodiment of the present disclosure.

For example, if the preset correspondence in this embodiment of the present disclosure is indicated by using the table, a specific format of the preset correspondence may be shown in Table 1.

TABLE 1

| Quantity of symbols used to send downlink data | Symbol used to send an aperiodic SRS |
| --- | --- |
| 3 | an eighth symbol, a tenth symbol, a twelfth symbol, and a fourteenth symbol |
| 6 | a tenth symbol, a twelfth symbol, and a fourteenth symbol |
| 9 or 10 | a twelfth symbol and a fourteenth symbol |
| 11 or 12 | a fourteenth symbol |

It should be noted that the preset correspondence shown in Table 1 is merely an example of a format of the preset correspondence in this embodiment of the present disclosure. In actual application, locations of the foregoing fields may be flexibly set based on an actual requirement. Details are not described herein.

The first subframe in this embodiment of the present disclosure may be a subframe that includes the first symbol set and the second symbol set. The first symbol set is a set that includes a symbol that is in the first subframe and that is used to send an aperiodic SRS, and the second symbol set is the set that includes a symbol that is in the first subframe and that is used to send downlink data. In this way, the preset correspondence may include the correspondence between the first value and the second symbol set. The first value indicates the quantity of symbols in the first subframe that are used to send the downlink data.

Optionally, a method for obtaining the first symbol set by the terminal device may be as follows: The terminal device receives a first common control message sent by the access network device in the first subframe and a second common control message sent by the access network device in a subframe before the first subframe, and determines the first value based on the first common control message and the second common control message; and the terminal device obtains, from the preset correspondence based on the first value determined by the terminal device, the first symbol set corresponding to the first value. Optionally, the first common control message and the second common control message are control messages used by the terminal device to determine the first value.

Similarly, the preset correspondence in this embodiment of the present disclosure may also include a correspondence between the first value and at least one of the first symbol set, a symbol set that is in the first subframe and that is used to send a PRACH (physical random access channel), and a symbol set that is in the first subframe and that is used to send a physical uplink control channel PUCCH (Physical Uplink Control Channel). In this way, the terminal device may also determine, based on the first value, the at least one of the first symbol set, the symbol set that is in the first subframe and that is used to send the PRACH, and the symbol set that is in the first subframe and that is used to send the PUCCH.

After the terminal device determines the symbol set that is in the first subframe and that is used to send the PRACH and/or the symbol set that is in the first subframe and that is used to send the PUCCH, the terminal device may send the PRACH and/or the PUCCH on all or some resources in a corresponding symbol set based on scheduling indication information sent by the access network device, preset timing information for sending uplink control information, or the like.

The scheduling indication information sent by the access network device may be information that the access network device schedules the terminal device to send the PRACH and/or the PUCCH. The preset timing information for sending the uplink control information means that after receiving the downlink data sent by the access network device, the terminal device needs to wait a preset timing time of sending the uplink control information before sending the uplink control information to the access network device.

For example, if the terminal device receives, at a moment N, the downlink data sent by the access network device, and the preset timing for sending the uplink control information is X, the terminal device sends, to the access network device at a moment N+X, hybrid automatic repeat request acknowledgement information corresponding to the downlink data.

Optionally, the first symbol set in this embodiment of the present disclosure may be further a symbol set indicated by second indication information, and the second indication information is information in higher layer signaling or physical layer signaling sent by the access network device.

Correspondingly, a method for obtaining the first symbol set by the terminal device may be as follows: The terminal device receives the higher layer signaling or the physical layer signaling that carries the second indication information and that is sent by the access network device, and the terminal device obtains the first symbol set based on the second indication information.

Specifically, when the access network device sends downlink data to the terminal device, the access network device can learn which symbols in the first subframe are occupied by the access network device to send the downlink data, so that the access network device can learn of a first value. The access network device can learn of information about the first symbol set based on the first value and the preset correspondence. In this way, the access network device can send, to the terminal device by using the higher layer signaling or the physical layer signaling, the second indication information indicating the first symbol set.

Optionally, if the access network device sends, to the terminal device by using the physical layer signaling, the second indication information indicating the first symbol set, the physical layer signaling may be signaling in a first common control message sent in the first subframe and/or signaling in a second common control message sent in a subframe before the first subframe.

Optionally, the first common control message and the second common control message are control messages used by the terminal device to determine the first value.

Similarly, the second indication information in this embodiment of the present disclosure may indicate at least one of the first symbol set, a symbol set used to send a PRACH, and a symbol set used to send a PUCCH. In this way, the terminal device may obtain, based on the second indication information, the at least one of the first symbol set, the symbol set used to send the PRACH, and the symbol set used to send the PUCCH.

After the terminal device determines the symbol set that is in the first subframe and that is used to send the PRACH and/or the symbol set that is in the first subframe and that is used to send the PUCCH, the terminal device may send the PRACH and/or the PUCCH on all or some resources in a corresponding symbol set based on scheduling indication information sent by the access network device, preset timing information for sending uplink control information, or the like.

After receiving the first indication information, the terminal device sends the aperiodic SRS to the access network device on the first symbol in the first subframe based on an instruction of the first indication information.

The first indication information may be indication information sent by the access network device by using physical layer signaling, and the indication information includes one of the following pieces of information:

(1) A status indicating whether the terminal device needs to send the aperiodic SRS in the first subframe.

If the status indicates that the terminal device needs to send the aperiodic SRS in the first subframe, the terminal device determines that the first indication information is used to instruct the terminal device to send the aperiodic SRS in the first subframe. If the status indicates that the terminal device does not need to send the aperiodic SRS in the first subframe, the terminal device does not send the aperiodic SRS in the first subframe.

The terminal device may determine a location of the first symbol in the first subframe in either of the following manners:

A. The terminal device determines the location of the first symbol by using a location of a predefined symbol that is in the first subframe and that is used to send the aperiodic SRS.

B. The terminal device determines the location of the first symbol through an operation performed based on a terminal device identifier of the terminal device and a predefined rule.

For example, if a value of the terminal device identifier is UE_ID, the first symbol is a $Q^{th}$ symbol in the first symbol set, where Q=(UE_ID mod L)+1, and L is a quantity of symbols included in the first subframe.

The terminal device identifier may be any one of a C-RNTI, an IMEI, an IMSI, a GUTI, an IP address, and the like that are of the terminal device.

Optionally, the terminal device performs clear channel assessment before sending the aperiodic SRS on the first symbol in the first subframe.

If the terminal device determines that the terminal device is allowed to occupy the first symbol in the first subframe to send information, the terminal device sends the aperiodic SRS on the first symbol in the first subframe. If the terminal device determines that the terminal device is not allowed to occupy the first symbol in the first subframe to send information, the terminal device cannot send the aperiodic SRS in the first subframe.

(2) A status indicating that the terminal device does not send the aperiodic SRS in the first subframe, or indicating that the terminal device sends the aperiodic SRS on the first symbol in the first subframe and indicating a location of the first symbol in the first symbol set.

If the first indication information is used to instruct the terminal device not to send the aperiodic SRS in the first subframe, the terminal device does not send the aperiodic SRS in the first subframe.

If the first indication information is used to instruct the terminal device to send the aperiodic SRS on the first symbol in the first subframe, the terminal device determines a location of the first symbol in the first subframe based on the first indication information, to be specific, information about the location of the first symbol in the first subframe is included in the first indication information.

For example, if the first subframe is a last subframe in a downlink burst, and a quantity D of symbols in the first subframe that are used to send downlink data is less than a quantity L of symbols included in the first subframe, the first indication information indicates a location of the first symbol in the first symbol set in the first subframe. The first symbol set is a set that includes L-D symbols other than the symbols used to send the downlink data in the first subframe. L is the quantity of symbols included in the first subframe, and D is the quantity of symbols in the first subframe that are used to send the downlink data. After determining that the terminal device is instructed by the first indication information to send the aperiodic SRS on the first symbol in the first subframe, the terminal device sends the aperiodic SRS on the first symbol in the first subframe.

Optionally, the terminal device performs clear channel assessment before sending the aperiodic SRS on the first symbol in the first subframe.

If the terminal device determines that the terminal device is allowed to occupy the first symbol in the first subframe to send information, the terminal device sends the aperiodic SRS on the first symbol in the first subframe. If the terminal device determines that the terminal device is not allowed to occupy the first symbol in the first subframe to send information, the terminal device does not send the aperiodic SRS in the first subframe.

Optionally, the first indication information in this embodiment of the present disclosure further includes information referenced when the terminal device sends the aperiodic SRS on the first symbol, for example, reference information of performing clear channel assessment by the terminal device and/or information about which subframe the first subframe is.

Optionally, the first indication information in this embodiment of the present disclosure is information in a control message sent by the access network device, and the first indication information is one of M pieces of specific indication information included in the control message, where M≥2.

The control message includes the M pieces of specific indication information, and a $J^{th}$ piece of specific indication information in the M pieces of specific indication information is used to instruct a $J^{th}$ terminal device not to send an aperiodic SRS or instruct the $J^{th}$ terminal device to send the aperiodic SRS on a $P^{th}$ symbol in a second subframe, where M≥2, J≤M, and P≥1.

The control message sent by the access network device may be received by a plurality of terminal devices. To improve resource utilization, the control message sent by the access network device may include the M pieces of specific indication information. In this way, a maximum of M terminal devices may send aperiodic SRSs based on specific indication information corresponding to each of the M terminal devices.

It is easily understood that the second subframe is any subframe. Therefore, in this embodiment of the present disclosure, the second subframe and the first subframe may be a same subframe or different subframes.

In this embodiment of the present disclosure, the control message may be used to instruct different terminal devices to send aperiodic SRSs in a same subframe, or may be used to instruct different terminal devices to send aperiodic SRSs in different subframes.

The $J^{th}$ piece of specific indication information in the M pieces of specific indication information included in the control message is used to instruct the $J^{th}$ terminal device not to send the aperiodic SRS or instruct the $J^{th}$ terminal device to send the aperiodic SRS on the $P^{th}$ symbol in the second subframe. Therefore, values of P corresponding to different pieces of specific indication information in the M pieces of specific indication information may be the same or different.

To be specific, the control message may be used to instruct different terminal devices to send aperiodic SRSs on different symbols in a same subframe, or may be used to instruct different terminal devices to send aperiodic SRSs on a same symbol in different subframes, or may be used to instruct different terminal devices to send aperiodic SRSs on different symbols in different subframes.

It should be noted that the M pieces of specific indication information included in the control message may be mutually independent, and each piece of specific indication information is corresponding to only one terminal device.

Figure 6:
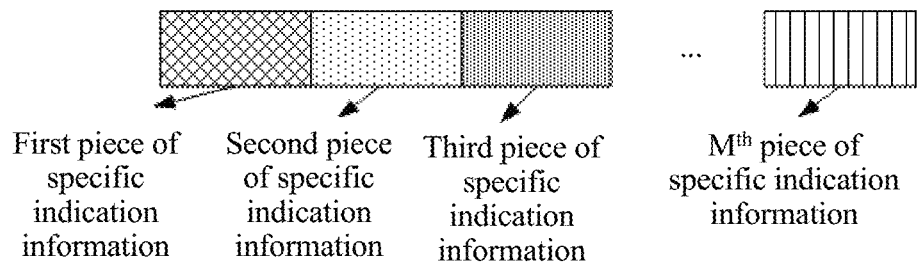
FIG. 6 is a first format diagram of a control message according to an embodiment of the present disclosure.

For example, as shown in FIG. 6, a control message includes M pieces of specific indication information. First indication information configured by an access network device for a terminal device by using higher layer signaling is information indicated by a third piece of specific indication information in the M pieces of specific indication information. In this case, after receiving the control message that carries the M pieces of specific indication information, the terminal device may determine, from the control message, that the first indication information corresponding to the terminal device is the information indicated by the third piece of specific indication information. In addition, the access network device sends the control message to at least one another terminal device. After each of the at least one another terminal device receives the control message, the other terminal device obtains, based on first indication information configured by the access network device for the another terminal device, the first indication information of the another terminal device from the M pieces of specific indication information included in the control message.

Optionally, the first indication information in this embodiment of the present disclosure further includes information referenced when the terminal device sends the aperiodic SRS on the first symbol, for example, reference information of performing clear channel assessment by the terminal device and/or information about which subframe the first subframe is.

Further, the control message includes N pieces of common reference indication information, a $K^{th}$ piece of common reference indication information in the N pieces of common reference indication information is corresponding to a $K^{th}$ terminal device group, each terminal device in the $K^{th}$ terminal device group sends an aperiodic SRS by referring to the $K^{th}$ piece of common reference indication information, and each terminal device in the $K^{th}$ terminal device group sends the aperiodic SRS within a same time period, where N≥1 and K≤N.

For example, each terminal device in the $K^{th}$ terminal device group sends the aperiodic SRS on a same symbol, or each terminal device in the $K^{th}$ terminal device group sends the aperiodic SRS in a same subframe.

Optionally, the $K^{th}$ piece of common reference indication information includes at least one of reference information of performing clear channel assessment by the terminal device in the $K^{th}$ terminal device group before the terminal device in the $K^{th}$ terminal device group sends the aperiodic SRS and time location information of a subframe in which the terminal device in the $K^{th}$ terminal device group sends the aperiodic SRS.

Time information of sending an aperiodic SRS by any terminal device includes at least one of information about a subframe in which the terminal device sends the aperiodic SRS and information about a symbol on which the terminal device sends the aperiodic SRS.

Each terminal device needs to perform clear channel assessment before sending the aperiodic SRS. The reference information of performing clear channel assessment by the terminal device includes at least one of indication information indicating whether the CCA needs to be currently performed, an assessment type of current CCA, an execution time of the current CCA, a contention window length of the current CCA, and a backoff count value of the current CCA.

In this embodiment of the present disclosure, terminal devices that are configured to send aperiodic SRSs in a same subframe or on a same symbol in a same subframe are combined into a terminal device group. When performing CCA, all the terminal devices in the terminal device group use a same channel monitoring manner and a same channel monitoring parameter. Therefore, information jointly referenced by all the terminal devices in the terminal device group is represented by one piece of common reference indication information in the control message, and there is no need to indicate, to each terminal device in the terminal device group, the reference information of performing CCA. In this way, resource usage of the control message can be effectively reduced.

Figure 7:
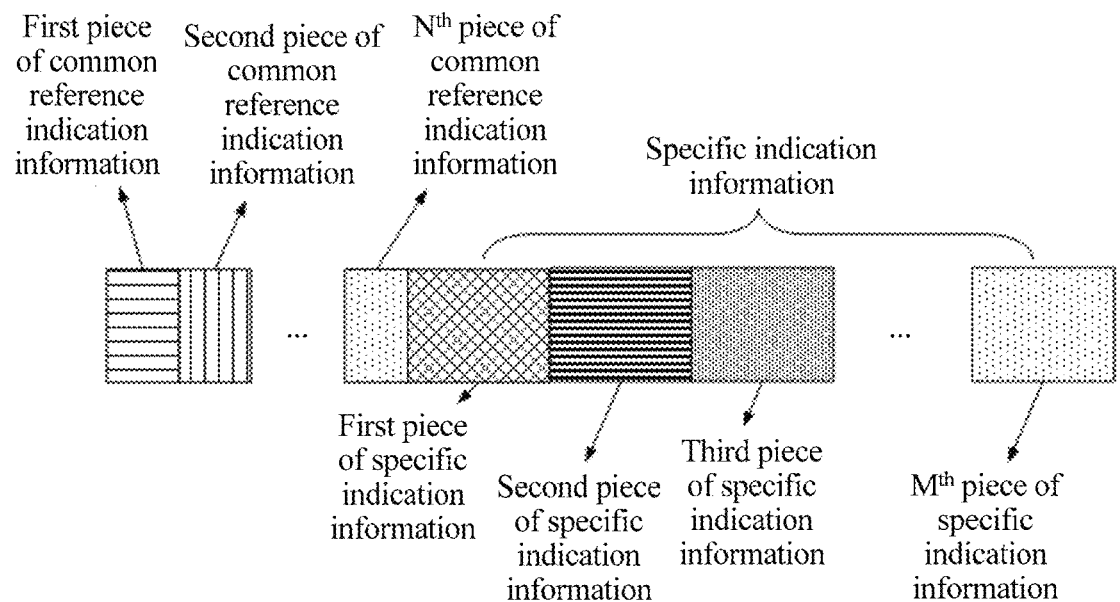
FIG. 7 is a second format diagram of a control message according to an embodiment of the present disclosure.

For example, as shown in FIG. 7, a control message includes N pieces of common reference indication information and M pieces of specific indication information. A first piece of common reference indication information is corresponding to a first terminal device group, and a first piece of specific indication information is used to instruct a terminal device to send an aperiodic SRS on a first symbol in a first subframe. If the terminal device belongs to the first terminal device group, the terminal device obtains the first piece of common reference indication information from the control message received by the terminal device, and sends the aperiodic SRS on the first symbol in the first subframe based on the first piece of common reference indication information obtained by the terminal device.

When the $K^{th}$ piece of common reference indication information in the control message is corresponding to content of different specific indication information, different information is indicated in the $K^{th}$ piece of common reference indication information.

Optionally, if the content of the specific indication information is a status indicating whether the terminal device needs to send the aperiodic SRS in the first subframe, the $K^{th}$ piece of common reference indication information includes at least one of information about a subframe in which the terminal device in the $K^{th}$ terminal device group sends the aperiodic SRS, information about a symbol on which the terminal device in the $K^{th}$ terminal device group sends the aperiodic SRS, and reference information of performing clear channel assessment by the terminal device in the $K^{th}$ terminal device group before the terminal device in the $K^{th}$ terminal device group sends the aperiodic SRS.

If the terminal device obtains, from one piece of specific indication information in the control message, indication information that the access network device instructs the terminal device not to send the aperiodic SRS in the first subframe, the terminal device does not need to obtain common reference indication information from the control message.

If the terminal device obtains, from one piece of specific indication information in the control message, indication information that the access network device instructs the terminal device to send the aperiodic SRS in the first subframe, the terminal device needs to determine a location of the first symbol in the first subframe.

The terminal device may determine the location of the first symbol by using a terminal device identifier of the terminal device and a predefined rule, or may obtain the location of the first symbol in the first subframe from one piece of common reference indication information.

In addition, the terminal device needs to determine reference information of sending the aperiodic SRS on the first symbol in the first subframe.

For example, if the reference information of sending the aperiodic SRS on the first symbol in the first subframe is reference information of performing clear channel assessment by the terminal device before the terminal device sends the aperiodic SRS, the terminal device may obtain, from one piece of common reference indication information, the reference information of sending the aperiodic SRS by the terminal device on the first symbol in the first subframe. In addition, the terminal device needs to determine a time location of the first subframe.

A method for determining the time location of the first subframe by the terminal device may be as follows: The terminal device determines the time location of the first subframe based on preset timing information and a subframe in which the terminal device receives the control message sent by the access network device, or the terminal device may obtain time location information of the first subframe from the common reference indication information.

Optionally, if the content of the specific indication information is a status indicating that the terminal device does not send the aperiodic SRS in the first subframe, or indicating that the terminal device sends the aperiodic SRS on the first symbol in the first subframe and indicating a location of the first symbol in the first subframe, or indicating that the terminal device sends the aperiodic SRS on the first symbol in the first subframe and indicating a location of the first symbol in the first symbol set, the $K^{th}$ piece of common reference indication information in the common reference indication information includes at least one of information about a subframe in which the terminal device in the $K^{th}$ terminal device group sends the aperiodic SRS and reference information of performing clear channel assessment by the terminal device in the $K^{th}$ terminal device group before the terminal device in the $K^{th}$ terminal device group sends the aperiodic SRS.

If the terminal device obtains, from one piece of specific indication information in the control message, indication information that the access network device instructs the terminal device not to send the aperiodic SRS in the first subframe, the terminal device does not need to obtain common reference indication information from the control message.

If the terminal device obtains, from one piece of specific indication information in the control message, location information of the first symbol in the first subframe and indication information that the access network device instructs the terminal device to send the aperiodic SRS on the first symbol in the first subframe, the terminal device needs to determine reference information of sending the aperiodic SRS by the terminal device on the first symbol in the first subframe.

If the reference information of sending the aperiodic SRS by the terminal device on the first symbol in the first subframe is reference information of performing clear channel assessment by the terminal device before the terminal device sends the aperiodic SRS, the terminal device may obtain, from common reference indication information, the reference information of sending the aperiodic SRS on the first symbol in the first subframe.

In addition, the terminal device needs to determine a time location of the first subframe. A method for determining the time location of the first subframe by the terminal device may be as follows: The terminal device determines the time location of the first subframe based on preset timing information and a subframe in which the terminal device receives the control message sent by the access network device, or the terminal device may obtain time location information of the first subframe from the common reference indication information.

The control message includes N pieces of common reference indication information, a $K^{th}$ piece of common reference indication information in the N pieces of common reference indication information is corresponding to a $K^{th}$ terminal device group, each terminal device in the $K^{th}$ terminal device group sends an aperiodic SRS by referring to the $K^{th}$ piece of common reference indication information, and each terminal device in the $K^{th}$ terminal device group sends the aperiodic SRS within a same time period.

Optionally, the terminal device may obtain, from one piece of specific indication information in the M pieces of specific indication information in the control message, time information of sending the aperiodic SRS by the terminal device, or may determine, by using a terminal device identifier of the terminal device and a predefined rule, time information of information about sending the aperiodic SRS by the terminal device. The time information of information about sending the aperiodic SRS by the terminal device may be preset time information or the like.

The time information of sending the aperiodic SRS by the terminal device may be a first time period. Then the terminal device sends the aperiodic SRS within the first time period. That the terminal device sends the aperiodic SRS within the first time period means that the terminal device occupies some or all times in the first time period to send the aperiodic SRS provided that the terminal device sends the aperiodic SRS within the first time period.

The terminal device may determine, based on information that the terminal device is instructed to send the aperiodic SRS within the first time period and that is obtained by the terminal device, a terminal device group to which the terminal device belongs, and further obtain, from common reference indication information corresponding to the terminal device group, reference indication information of sending the aperiodic SRS.

Optionally, the $K^{th}$ piece of common reference indication information in the N pieces of common reference indication information included in the control message is corresponding to the $K^{th}$ terminal device group, and each terminal device in the $K^{th}$ terminal device group sends the aperiodic SRS within the same time period. A correspondence between the $K^{th}$ piece of common reference indication information and the $K^{th}$ terminal device group is preset.

For example, if the access network device sends a control message in which a first control field is the $K^{th}$ piece of common reference indication information, when the terminal device receives the control message, and determines that common reference indication information corresponding to the terminal device is the $K^{th}$ piece of common reference indication information, the terminal device reads the $K^{th}$ piece of common reference indication information from the first control field in the control message, and sends the aperiodic SRS based on the $K^{th}$ piece of common reference indication information.

Optionally, the $K^{th}$ piece of common reference indication information in the N pieces of common reference indication information included in the control message is corresponding to the $K^{th}$ terminal device group, and the $K^{th}$ terminal device group may not include any terminal device.

For example, the $K^{th}$ piece of common reference indication information in the N pieces of common reference indication information is information jointly referenced by a plurality of terminal devices that send aperiodic SRSs on a fifth symbol in the first subframe. If no terminal device sends an aperiodic SRS on the fifth symbol in the first subframe during transmission of a current control message, the $K^{th}$ terminal device group does not include any terminal device. The $K^{th}$ piece of common reference indication information in the N pieces of common reference indication information is reserved information, and no terminal device needs to read the reserved information.

For example, the control message includes N pieces of common reference indication information and M pieces of specific indication information. A $K^{th}$ piece of common reference indication information in the N pieces of common reference indication information is corresponding to a $K^{th}$ terminal device group, each terminal device in the $K^{th}$ terminal device group sends an aperiodic SRS on the first symbol, and the $K^{th}$ terminal device group includes X terminal devices. If Y pieces of specific indication information in the M pieces of specific indication information are used to instruct to send an aperiodic SRS on the first symbol, and the M pieces of specific indication information include no specific indication information used to instruct not to send an aperiodic SRS on the first symbol, X is equal to Y. If Y pieces of specific indication information in the M pieces of specific indication information are used to instruct to send an aperiodic SRS on the first symbol, and H pieces of specific indication information in the M pieces of specific indication information are used to instruct not to send an aperiodic SRS on the first symbol, X is not equal to Y.

Optionally, before the access network device sends the control message, the access network device adds a CRC (cyclic redundancy check) bit to information included in the control message, and then performs channel coding on the information to which the CRC bit is added.

Optionally, when performing channel coding, the access network device scrambles the CRC check bit by using a first RNTI (radio network temporary identifier), e.g. C-RNTI (cell radio network temporary identifier). After receiving the control message, the terminal device descrambles information on the CRC check bit by using the first RNTI, and determines whether the control message carries information sent by the access network device to the terminal device. If coding check succeeds after the terminal device descrambles the information on the CRC check bit by using the first RNTI, the terminal device determines that the control message carries the information sent by the access network device to the terminal device. If coding check fails after the terminal device descrambles the information on the CRC check bit by using the first RNTI, the terminal device determines that the control message carries no information sent by the access network device to the terminal device.

Optionally, the control message further includes terminal device set identification information, and the terminal device set identification information is used to identify a terminal device set that sends an aperiodic SRS based on the control message.

The terminal device may determine, based on the terminal device set identification information, whether the terminal device needs to receive the control message, and then send the aperiodic SRS based on the control message.

Figure 8:
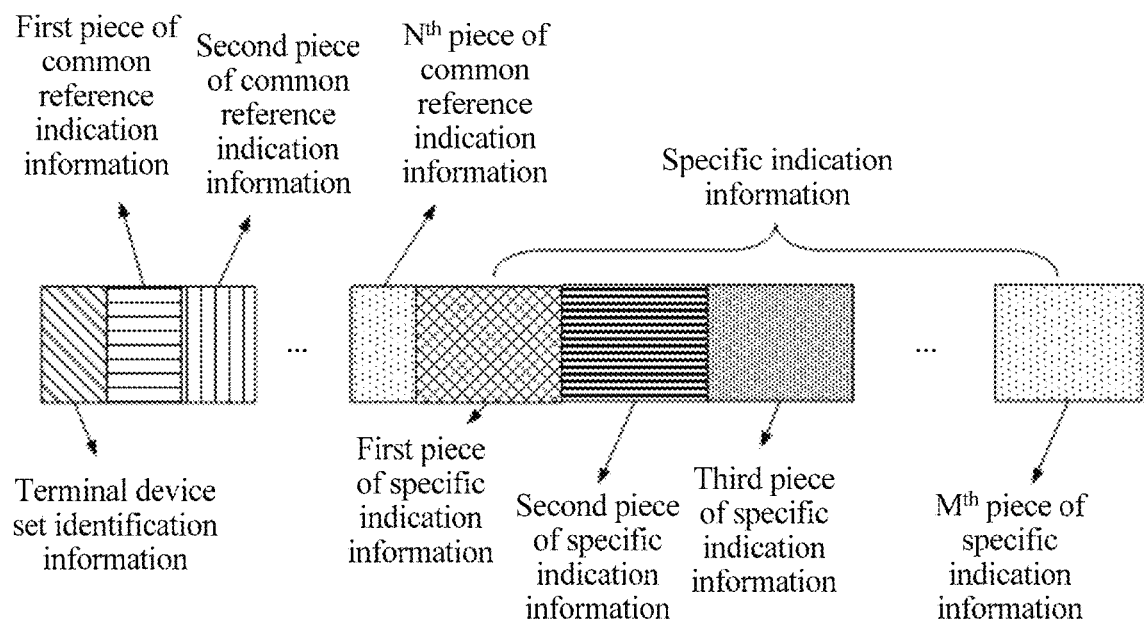
FIG. 8 is a third format diagram of a control message according to an embodiment of the present disclosure.

For example, with reference to FIG. 7, as shown in FIG. 8, a control message further includes terminal device set identification information.

Each terminal device set has terminal device set identification information corresponding to the terminal device set. A terminal device belongs to a specific terminal device set. The terminal device set identification information included in the control message is used to identify the terminal device set that sends the aperiodic SRS based on the control message.

For example, identification information of a terminal device set 1 is "0", and identification information of a terminal device set 2 is "1". If the terminal device belongs to the terminal device set 1, and indication information of the terminal device set identification information in the control message received by the terminal device is "0", the terminal device sends the aperiodic SRS based on other information in the control message. Otherwise, the terminal device does not send the aperiodic SRS based on other information in the control message.

Optionally, a terminal device belongs to at least one terminal device set. The terminal device may determine, based on the terminal device set identification information in the control message, a location of specific indication information that is in the control message and that is corresponding to the terminal device.

For example, if identification information of a terminal device set 1 is "0", identification information of a terminal device set 2 is "1", a terminal device A belongs to both the terminal device set 1 and the terminal device set 2, and a network system presets, to an $(R1)^{th}$ piece of specific indication information, specific indication information that needs to be obtained by the terminal device A when the terminal device A belongs to the terminal device set 1, and presets, to an $(R2)^{th}$ piece of specific indication information, specific indication information that needs to be obtained by the terminal device A when the terminal device A belongs to the terminal device set 2, after the terminal device A receives a control message in which indication information of terminal device set identification information is "0", the terminal device sends an aperiodic SRS based on the $(R1)^{th}$ piece of specific indication information in the control message; or after the terminal device A receives a control message in which indication information of terminal device set identification information is "1", the terminal device sends an aperiodic SRS based on the $(R2)^{th}$ piece of specific indication information in the control message.

The access network device may send, at different times based on terminal device set identification information, control messages corresponding to different terminal device sets, to improve indication efficiency of the control messages.

It should be noted that the control message in this embodiment of the present disclosure may be applied to an application scenario in which the terminal device communicates with the access network device on a carrier of an unlicensed spectrum, or may be applied to an application scenario in which the terminal device communicates with the access network device on a carrier of a licensed spectrum. In other words, the control message that includes the N pieces of common reference indication information and/or the terminal device set identification information is applicable to the application scenario of the carrier of the licensed spectrum or the application scenario of carrier of the unlicensed spectrum.

In this embodiment of the present disclosure, the terminal device can obtain the first indication information used to instruct the terminal device to send the aperiodic SRS in the first subframe. Therefore, the terminal device can send the aperiodic SRS on the first symbol in the first subframe based on the first indication information, to be specific, a symbol used when the terminal device sends the aperiodic SRS is no longer fixed, so as to effectively resolve a problem that an existing terminal device cannot send an aperiodic SRS on the carrier of the unlicensed spectrum.

An embodiment of the present disclosure provides a terminal device 1. The terminal device 1 is configured to perform steps performed by a terminal device in the foregoing aperiodic SRS transmission method. The terminal device 1 may include modules corresponding to the corresponding steps.

Figure 9:
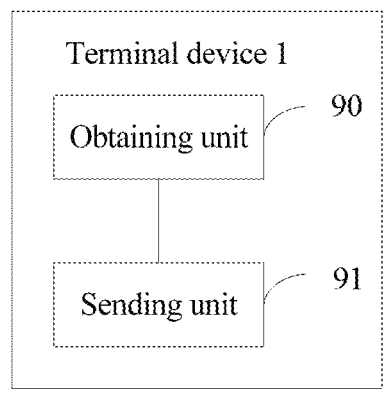
FIG. 9 is a first schematic structural diagram of a terminal device according to an embodiment of the present disclosure.

As shown in FIG. 9, the terminal device 1 includes an obtaining unit 90 and a sending unit 91.

The obtaining unit 90 is configured to obtain first indication information. The first indication information is used to instruct the terminal device to send an aperiodic sounding reference signal SRS on a first symbol in a first subframe.

The sending unit 91 is configured to send the aperiodic SRS on the first symbol based on the first indication information obtained by the obtaining unit.

Optionally, the first symbol belongs to a first symbol set, the first symbol set includes a symbol that is in the first subframe and that is used to send an aperiodic SRS, and if the first symbol set includes at least two symbols, any two of the at least two symbols are discontinuous in terms of time.

Optionally, the first subframe is a last subframe in a downlink burst, and a quantity of symbols in the first subframe that are used to send downlink data is less than a quantity of symbols included in the first subframe.

Optionally, the first symbol set is a symbol set corresponding to a first value in a preset correspondence, the preset correspondence includes a correspondence between the first value and the first symbol set, the first value is used to indicate a quantity of symbols in the first subframe that are included in a second symbol set, and the second symbol set includes a symbol that is in the first subframe and that is used to send downlink data.

Optionally, the first symbol set is a symbol set indicated by second indication information, and the second indication information is information in higher layer signaling or physical layer signaling sent by an access network device.

Optionally, the first indication information is information in a control message sent by the access network device, the first indication information is one of M pieces of specific indication information included in the control message, a $J^{th}$ piece of specific indication information in the M pieces of specific indication information is used to instruct a $J^{th}$ terminal device not to send an aperiodic SRS or instruct the $J^{th}$ terminal device to send the aperiodic SRS on a $P^{th}$ symbol in a second subframe, and the second subframe is a subframe on a carrier of an unlicensed spectrum, where $M \geq 2$, $J \leq M$, and $P \geq 1$.

Optionally, the control message further includes N pieces of common reference indication information, a $K^{th}$ piece of common reference indication information in the N pieces of common reference indication information is corresponding to a $K^{th}$ terminal device group, each terminal device in the $K^{th}$ terminal device group sends an aperiodic SRS by referring to the $K^{th}$ piece of common reference indication information, and each terminal device in the $K^{th}$ terminal device group sends the aperiodic SRS within a same time period, where $N \geq 1$ and $K \leq N$.

Optionally, the $K^{th}$ piece of common reference indication information includes at least one of reference information of performing clear channel assessment by the terminal device in the $K^{th}$ terminal device group and time information of sending the aperiodic SRS by the terminal device in the $K^{th}$ terminal device group, and the time information of sending the aperiodic SRS by the terminal device in the $K^{th}$ terminal device group includes information about a subframe in which the terminal device in the $K^{th}$ terminal device group sends the aperiodic SRS.

Optionally, if the terminal device 1 belongs to the $K^{th}$ terminal device group, the obtaining unit 90 is specifically configured to obtain the $K^{th}$ piece of common reference indication information; and the sending unit 91 is specifically configured to send the aperiodic SRS on the first symbol based on the $K^{th}$ piece of common reference indication information obtained by the obtaining unit 90.

Optionally, the control message further includes terminal device set identification information, the terminal device set identification information is used to identify a terminal device set, and each terminal device in the terminal device set sends an aperiodic SRS based on the control message.

It may be understood that the terminal device 1 in this embodiment of this application is merely logically divided based on functions implemented by the terminal device 1. In actual application, the foregoing units may be superposed or divided.

The functions implemented by the terminal device 1 provided in this embodiment of this application are in a one-to-one correspondence with the aperiodic SRS transmission method provided in the foregoing embodiment. A more detailed processing procedure implemented by the terminal device 1 is described in detail in the foregoing method embodiment. Details are not described herein again.

Figure 10:
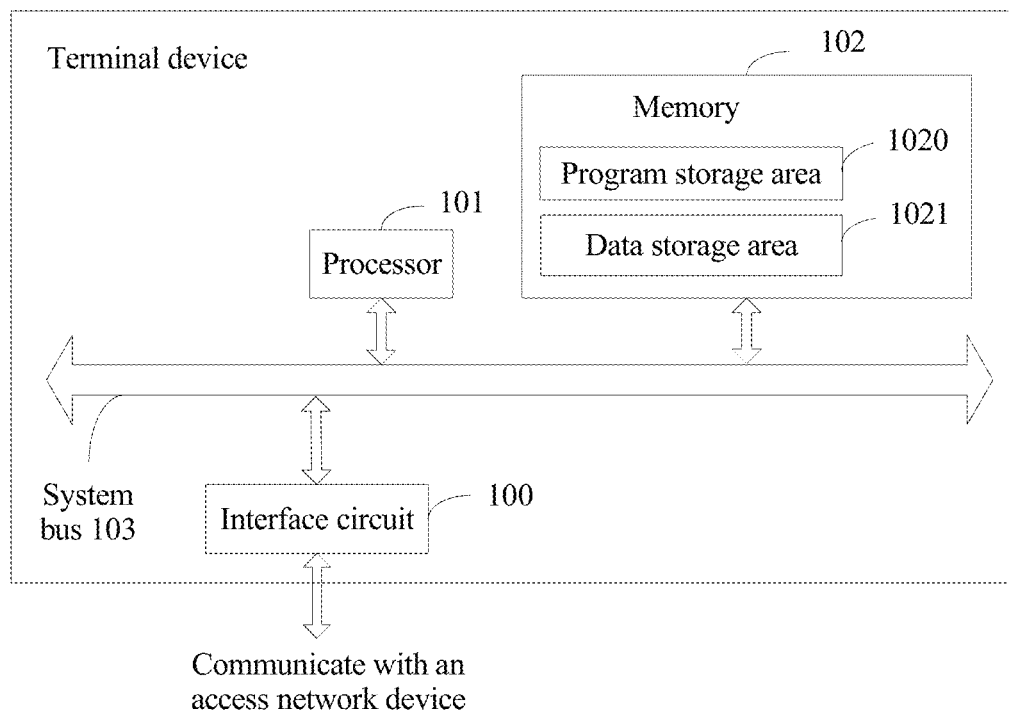
FIG. 10 is a second schematic structural diagram of a terminal device according to an embodiment of the present disclosure.

Another embodiment of this application provides a terminal device. As shown in FIG. 10, the terminal device includes an interface circuit 100, a processor 101, a memory 102, and a system bus 103.

The interface circuit 100, the processor 101, and the memory 102 are connected by using the system bus 103 and complete mutual communication.

A person skilled in the art may understand that a structure of the terminal device shown in FIG. 10 does not constitute a limitation on a terminal device, and the terminal device may include more or fewer parts than those shown in the figure, or combine some parts, or have different part arrangements.

Specifically, when the terminal device runs, the terminal device performs the aperiodic SRS transmission method in the embodiment shown in FIG. 2. For details of the aperiodic SRS transmission method, refer to related descriptions in the embodiment shown in FIG. 2. The details are not described herein again.

By referring to the foregoing embodiment, the interface circuit 100 in this embodiment of this application may be the obtaining unit 90 in the foregoing embodiment, or may be the sending unit 91 in the foregoing embodiment.

Specifically, the interface circuit 100 is configured to implement a communication connection between the terminal device and an access network device.

Specifically, the memory 102 may be configured to store a software program and an application module, and the processor 101 performs various function applications of the terminal device and data processing by running the software program and the application module that are stored in the memory 102.

The memory 102 may mainly include a program storage area 1020 and a data storage area 1021, and the program storage area 1020 may store an operating system and an application program required by at least one function such as sending an SRS.

The memory 102 may include a volatile memory, for example, a high-speed RAM (random access memory). The memory 102 may also include a non-volatile memory, for example, at least one magnetic disk storage device, a flash memory device, or another volatile solid-state storage device. This is not specifically limited in this embodiment of this application.

Specifically, the processor 101 is a control center of the terminal device.

The processor 101 is connected to all parts of the entire terminal device by using various interfaces and lines, and performs various functions of the terminal device and data processing by running or executing the software program and/or the application module that are stored in the memory 102 and invoking data stored in the memory 102, to perform overall monitoring on the terminal device.

Optionally, the processor 101 may be a CPU (central processing unit). The processor 101 may also be another general purpose processor, a DSP (digital signal processor) or another programmable logic device or transistor logic device, a discrete hardware component, or the like. This is not specifically limited in this embodiment of this application.

The general purpose processor may be a microprocessor, or the processor may be any conventional processor or the like.

The system bus 103 may include a data bus, a power bus, a control bus, a signal status bus, and the like.

In this embodiment of this application, for clarity of description, various buses are marked as the system bus 103 in FIG. 10.

In this embodiment of the present disclosure, the terminal device can obtain first indication information used to instruct the terminal device to send an aperiodic SRS in a first subframe. Therefore, the terminal device can send the aperiodic SRS on a first symbol in the first subframe based on the first indication information, to be specific, a symbol used when the terminal device sends the aperiodic SRS is no longer fixed, so as to effectively resolve a problem that an existing terminal device cannot send an aperiodic SRS on a carrier of an unlicensed spectrum.

An embodiment of the present disclosure provides an access network device 1. The access network device 1 is configured to perform steps performed by the access network device in the foregoing aperiodic SRS transmission method. The access network device 1 may include modules corresponding to the corresponding steps.

Figure 11:
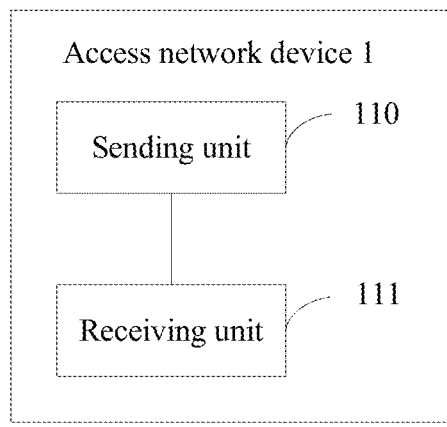
FIG. 11 is a first schematic structural diagram of an access network device according to an embodiment of the present disclosure.

As shown in FIG. 11, the access network device 1 includes a sending unit 110 and a receiving unit 111.

The sending unit 110 is configured to send first indication information to a terminal device. The first indication information is used to instruct the terminal device to send an aperiodic sounding reference signal SRS on a first symbol in a first subframe.

The receiving unit 111 is configured to receive, on the first symbol in the first subframe, the aperiodic SRS sent by the terminal device.

Optionally, the first symbol belongs to a first symbol set, the first symbol set includes a symbol that is in the first subframe and that is used to send an aperiodic SRS, and if the first symbol set includes at least two symbols, any two of the at least two symbols are discontinuous in terms of time.

Optionally, the first subframe is a last subframe in a downlink burst, and a quantity of symbols in the first subframe that are used to send downlink data is less than a quantity of symbols included in the first subframe.

Optionally, the first symbol set is a symbol set corresponding to a first value in a preset correspondence, the preset correspondence includes a correspondence between the first value and the first symbol set, the first value is used to indicate a quantity of symbols in the first subframe that are included in a second symbol set, and the second symbol set includes a symbol that is in the first subframe and that is used to send downlink data.

Optionally, the first symbol set is a symbol set indicated by second indication information, and the second indication information is information in higher layer signaling or physical layer signaling sent by the access network device.

Optionally, the first indication information is information in a control message sent by the sending unit, the first indication information is one of M pieces of specific indication information included in the control message, a $J^{th}$ piece of specific indication information in the M pieces of specific indication information is used to instruct a $J^{th}$ terminal device not to send an aperiodic SRS or instruct the $J^{th}$ terminal device to send the aperiodic SRS on a $P^{th}$ symbol in a second subframe, and the second subframe is a subframe on a carrier of an unlicensed spectrum, where M≥2, J≤M, and P≥1.

Optionally, the control message further includes N pieces of common reference indication information, a $K^{th}$ piece of common reference indication information in the N pieces of common reference indication information is corresponding to a $K^{th}$ terminal device group, each terminal device in the $K^{th}$ terminal device group sends an aperiodic SRS by referring to the $K^{th}$ piece of common reference indication information, and each terminal device in the $K^{th}$ terminal device group sends the aperiodic SRS within a same time period, where N≥1 and K≤N.

Optionally, the $K^{th}$ piece of common reference indication information includes at least one of reference information of performing clear channel assessment by the terminal device in the $K^{th}$ terminal device group and time information of sending the aperiodic SRS by the terminal device in the $K^{th}$ terminal device group, and the time information of sending the aperiodic SRS by the terminal device in the $K^{th}$ terminal device group includes at least one of information about a subframe in which the terminal device in the $K^{th}$ terminal device group sends the aperiodic SRS and information about a symbol on which the terminal device in the $K^{th}$ terminal device group sends the aperiodic SRS.

Optionally, if the terminal device belongs to the $K^{th}$ terminal device group, the sending unit 110 is specifically configured to send, to the terminal device, the control message that includes the $K^{th}$ piece of common reference indication information and the first indication information.

Optionally, the control message further includes terminal device set identification information, the terminal device set identification information is used to identify a terminal device set, and each terminal device in the terminal device set sends an aperiodic SRS based on the control message.

It may be understood that the access network device 1 in this embodiment of this application is merely logically divided based on functions implemented by the access network device 1. In actual application, the foregoing units may be superposed or divided.

The functions implemented by the access network device 1 provided in this embodiment of this application are in a one-to-one correspondence with the aperiodic SRS transmission method provided in the foregoing embodiment. A more detailed processing procedure implemented by the access network device 1 is described in detail in the foregoing method embodiment. Details are not described herein again.

Figure 12:
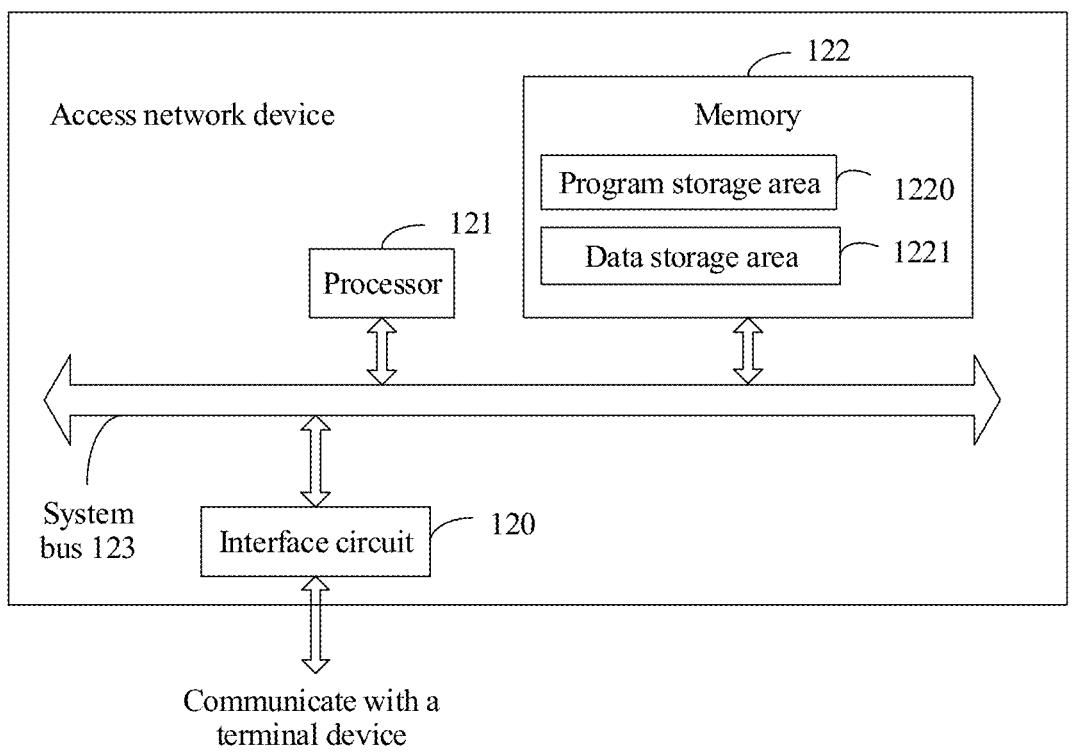
FIG. 12 is a second schematic structural diagram of an access network device according to an embodiment of the present disclosure.

Another embodiment of this application provides an access network device. As shown in FIG. 12, the access network device includes an interface circuit 120, a processor 121, a memory 122, and a system bus 123.

The interface circuit 120, the processor 121, and the memory 122 are connected by using the system bus 123 and complete mutual communication.

A person skilled in the art may understand that a structure of the access network device shown in FIG. 12 does not constitute a limitation on an access network device, and the access network device may include more or fewer parts than those shown in the figure, or combine some parts, or have different part arrangements.

Specifically, when the access network device runs, the access network device performs the aperiodic SRS transmission method in the embodiment shown in FIG. 2. For details of the aperiodic SRS transmission method, refer to related descriptions in the embodiment shown in FIG. 2. The details are not described herein again.

By referring to the foregoing embodiment, the interface circuit 120 in this embodiment of this application may be the sending unit 110 in the foregoing embodiment, or may be the receiving unit 111 in the foregoing embodiment.

Specifically, the interface circuit 120 is configured to implement a communication connection between a terminal device and the access network device.

Specifically, the memory 122 may be configured to store a software program and an application module, and the processor 121 performs various function applications of the access network device and data processing by running the software program and the application module that are stored in the memory 122.

The memory 122 may mainly include a program storage area 1220 and a data storage area 1221, and the program storage area 1220 may store an operating system and an application program required by at least one function such as receiving an SRS.

The memory 122 may include a volatile memory, for example, a high-speed RAM (random access memory). The memory 122 may also include a non-volatile memory, for example, at least one magnetic disk storage device, a flash memory device, or another volatile solid-state storage device. This is not specifically limited in this embodiment of this application.

Specifically, the processor 121 is a control center of the access network device.

The processor 121 is connected to all parts of the entire access network device by using various interfaces and lines, and performs various functions of the access network device and data processing by running or executing the software program and/or the application module that are stored in the memory 122 and invoking data stored in the memory 122, to perform overall monitoring on the access network device.

Optionally, the processor 121 may be a CPU (central processing unit). The processor 121 may also be another general purpose processor, a DSP (digital signal processor) or another programmable logic device or transistor logic device, a discrete hardware component, or the like. This is not specifically limited in this embodiment of this application.

The general purpose processor may be a microprocessor, or the processor may be any conventional processor or the like.

The system bus 123 may include a data bus, a power bus, a control bus, a signal status bus, and the like.

In this embodiment of this application, for clarity of description, various buses are marked as the system bus 123 in FIG. 12.

In this embodiment of the present disclosure, a symbol used when the terminal device sends an aperiodic SRS is configured by the access network device. Therefore, the symbol used when the terminal device sends the aperiodic SRS is no longer fixed, so as to effectively resolve a problem that an existing terminal device cannot send an aperiodic SRS on a carrier of an unlicensed spectrum.

It may be clearly understood by a person skilled in the art that, for the purpose of convenient and brief description, division of the foregoing function modules is taken as an example for illustration. In actual application, the foregoing functions can be allocated to different function modules and implemented according to a requirement, in other words, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of the present disclosure. The foregoing storage medium includes any medium that can store program code, such as a USB flash drive, a removable hard disk, a ROM (read-only memory), a RAM (random access memory), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An aperiodic sounding reference signal (SRS) transmission method, comprising:
    obtaining, by a terminal device, first indication information, wherein the first indication information is used to instruct the terminal device to send an aperiodic SRS on a first symbol in a first subframe; and
    sending, by the terminal device, the aperiodic SRS on the first symbol based on the first indication information, wherein:
        the first symbol belongs to a first symbol set comprising a symbol that is in the first subframe and that is used to send an aperiodic SRS; and
        when the first symbol set comprises at least two symbols, any two of the at least two symbols are discontinuous in terms of time.

2. The transmission method according to claim 1, wherein:
    the first subframe is a last subframe in a downlink burst, and a quantity of symbols in the first subframe for sending downlink data is less than a quantity of symbols comprised in the first subframe.

3. The transmission method according to claim 1, wherein:
    the first symbol set is a symbol set corresponding to a first value in a first preset correspondence, the first preset correspondence comprises a correspondence between the first value and the first symbol set, the first value for indicating a quantity of symbols in the first subframe that are comprised in a second symbol set, and the second symbol set comprises a symbol that is in the first subframe for sending downlink data.

4. The transmission method according to claim 1, wherein:
    the first symbol set is a symbol set indicated by second indication information comprising information in higher layer signaling or physical layer signaling sent by an access network device.

5. The transmission method according to claim 1, wherein:
    the first indication information is information in a control message sent by an access network device, the first indication information is one of M pieces of specific indication information comprised in the control message, and a $J^{th}$ piece of specific indication information in the M pieces of specific indication information for instructing a $J^{th}$ terminal device not to send an aperiodic SRS or instruct the $J^{th}$ terminal device to send the aperiodic SRS on a $P^{th}$ symbol in a second subframe, wherein M≥2, J≤M, and P≥1.

6. The transmission method according to claim 5, wherein:
    the control message further comprises N pieces of common reference indication information, a $K^{th}$ piece of common reference indication information in the N pieces of common reference indication information is corresponding to a $K^{th}$ terminal device group, each terminal device in the $K^{th}$ terminal device group sends an aperiodic SRS by referring to the $K^{th}$ piece of common reference indication information, and each terminal device in the $K^{th}$ terminal device group sends the aperiodic SRS within a same time period, wherein N≥1 and K≤N.

7. A terminal device, comprising:
    a processor configured to obtain first indication information, wherein the first indication information is used to instruct the terminal device to send an aperiodic sounding reference signal (SRS) on a first symbol in a first subframe; and
    an interface circuit configured to send the aperiodic SRS on the first symbol based on the first indication information obtained by the processor, wherein:
        the first symbol belongs to a first symbol set comprising a symbol that is in the first subframe and that is used to send an aperiodic SRS; and
        when the first symbol set comprises at least two symbols, any two of the at least two symbols are discontinuous in terms of time.

8. The terminal device according to claim 7, wherein:
    the first subframe is a last subframe in a downlink burst, and a quantity of symbols in the first subframe for sending downlink data is less than a quantity of symbols comprised in the first subframe.

9. The terminal device according to claim 7, wherein:
    the first symbol set is a symbol set corresponding to a first value in a preset correspondence, the preset correspondence comprises a correspondence between the first value and the first symbol set, the first value for indicating a quantity of symbols in the first subframe that are comprised in a second symbol set, and the second symbol set comprises a symbol that is in the first subframe for sending downlink data.

10. The terminal device according to claim 7, wherein:
    the first symbol set is a symbol set indicated by second indication information comprising information in higher layer signaling or physical layer signaling sent by an access network device.

11. The terminal device according to claim 7, wherein:
    the first indication information is information in a control message sent by an access network device, the first indication information is one of M pieces of specific indication information comprised in the control message, a $J^{th}$ piece of specific indication information in the M pieces of specific indication information is used to instruct a $J^{th}$ terminal device not to send an aperiodic SRS or instruct the $J^{th}$ terminal device to send the aperiodic SRS on a $P^{th}$ symbol in a second subframe, and the second subframe is a subframe on a carrier of an unlicensed spectrum, wherein M≥2, J≤M, and P≥1.

12. The terminal device according to claim 11, wherein:
    the control message further comprises N pieces of common reference indication information, a $K^{th}$ piece of common reference indication information in the N pieces of common reference indication information is corresponding to a $K^{th}$ terminal device group, each terminal device in the $K^{th}$ terminal device group sends an aperiodic SRS by referring to the $K^{th}$ piece of common reference indication information, and each terminal device in the $K^{th}$ terminal device group sends the aperiodic SRS within a same time period, wherein N≥1 and K≤N.

13. An access network device, comprising:
a sending unit, configured to send first indication information to a terminal device for instructing the terminal device to send an aperiodic sounding reference signal (SRS) on a first symbol in a first subframe; and
a receiving unit, configured to receive, on the first symbol in the first subframe, the aperiodic SRS sent by the terminal device, wherein:
the first symbol belongs to a first symbol set comprising a symbol that is in the first subframe for sending an aperiodic SRS; and
when the first symbol set comprises at least two symbols, any two of the at least two symbols are discontinuous in terms of time.

14. The access network device according to claim 13, wherein:
the first subframe is a last subframe in a downlink burst, and a quantity of symbols in the first subframe that are used to send downlink data is less than a quantity of symbols comprised in the first subframe.

15. The access network device according to claim 13, wherein:
the first symbol set is a symbol set corresponding to a first value in a preset correspondence, the preset correspondence comprises a correspondence between the first value and the first symbol set, the first value for indicating a quantity of symbols in the first subframe that are comprised in a second symbol set, and the second symbol set comprises a symbol that is in the first subframe and that is used to send downlink data.

16. The access network device according to claim 13, wherein:
the first symbol set is a symbol set indicated by second indication information comprising information in higher layer signaling or physical layer signaling sent by the access network device.

17. The access network device according to claim 13, wherein:
the first indication information is information in a control message sent by the sending unit, the first indication information is one of M pieces of specific indication information comprised in the control message, a $J^{th}$ piece of specific indication information in the M pieces of specific indication information for instructing a $J^{th}$ terminal device not to send an aperiodic SRS or for instructing the $J^{th}$ terminal device to send the aperiodic SRS on a $P^{th}$ symbol in a second subframe, and the second subframe is a subframe on a carrier of an unlicensed spectrum, wherein $M \geq 2$, $J \leq M$, and $P \geq 1$.

* * * * *